United States Patent
Upadhyay et al.

(10) Patent No.: US 12,361,018 B2
(45) Date of Patent: Jul. 15, 2025

(54) UTILIZING IMMUTABLE UNIQUE IDENTIFIERS TO TAG DATABASE TO ENABLE GRANULAR MANAGEMENT OF DATABASE COPIES

(71) Applicant: Dell Products L.P., Round Rock, TX (US)

(72) Inventors: Navneet Upadhyay, Greater Noida (IN); Rejith Mohan M, Bengaluru (IN); Elango Chockalingam, Bangalore (IN)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/496,048

(22) Filed: Oct. 27, 2023

(65) Prior Publication Data
US 2025/0139122 A1    May 1, 2025

(51) Int. Cl.
  *G06F 16/00*    (2019.01)
  *G06F 16/27*    (2019.01)
(52) U.S. Cl.
  CPC .................... *G06F 16/27* (2019.01)
(58) Field of Classification Search
  CPC ...................................... G06F 16/27
  See application file for complete search history.

(56) References Cited

U.S. PATENT DOCUMENTS

| | | | |
|---|---|---|---|
| 8,095,572 B1 * | 1/2012 | Coghlan | G06F 16/22 707/804 |
| 9,116,848 B1 * | 8/2015 | Jordan | G06F 11/1453 |
| 9,710,505 B1 | 7/2017 | Mcalister et al. | |
| 10,158,911 B1 * | 12/2018 | Sengupta | G06F 16/951 |
| 10,318,387 B1 | 6/2019 | Chopra et al. | |
| 11,782,795 B2 | 10/2023 | Bijoy | |
| 2004/0260977 A1 * | 12/2004 | Ji | G06F 11/2066 714/36 |
| 2010/0250531 A1 * | 9/2010 | Andersen | G06Q 30/02 707/E17.108 |
| 2011/0320400 A1 | 12/2011 | Namini | |
| 2013/0339734 A1 | 12/2013 | Vernia | |
| 2014/0351584 A1 | 11/2014 | Checcucci | |
| 2015/0293817 A1 | 10/2015 | Subramanian | |
| 2017/0346694 A1 | 11/2017 | Buendgen et al. | |
| 2019/0205479 A1 * | 7/2019 | Zizka | G06F 8/751 |

(Continued)

OTHER PUBLICATIONS

"Oracle® Data Guard, Concepts and Administration." (Feb. 2021), Oracle, 19C E96244-04 (438 pages).

(Continued)

*Primary Examiner* — Syed H Hasan
(74) *Attorney, Agent, or Firm* — Chamberlain, Hrdlicka, White, Williams & Aughtry; Aly Z. Dossa

(57) ABSTRACT

In general, the technology relates to a method for managing database copies, the method includes receiving a request to perform copy discovery on a database, wherein the database is associated with a unique identifier (UID), identifying, using an agent operatively connected to the database, entries corresponding to copies of the database specified in a catalog that are associated with the UID, wherein the catalog is associated with the database, and providing, by the agent, information about the identified copies to a data manager, wherein a data manager applies a retention policy to the identified copies.

17 Claims, 12 Drawing Sheets

(56) References Cited

U.S. PATENT DOCUMENTS

| | | |
|---|---|---|
| 2021/0042437 A1 | 2/2021 | Al-mousa |
| 2021/0218565 A1 | 7/2021 | Flatow |
| 2022/0121524 A1* | 4/2022 | Upadhyay ............. G06F 16/219 |
| 2024/0134748 A1 | 4/2024 | Somaiah |
| 2024/0248815 A1* | 7/2024 | Marri .................. G06F 11/1435 |

OTHER PUBLICATIONS

Unknown, Combined Search and Examination Report under Section 17 and 18(3) for 2413027.0, pp. 1-6, Feb. 19, 2025.

* cited by examiner

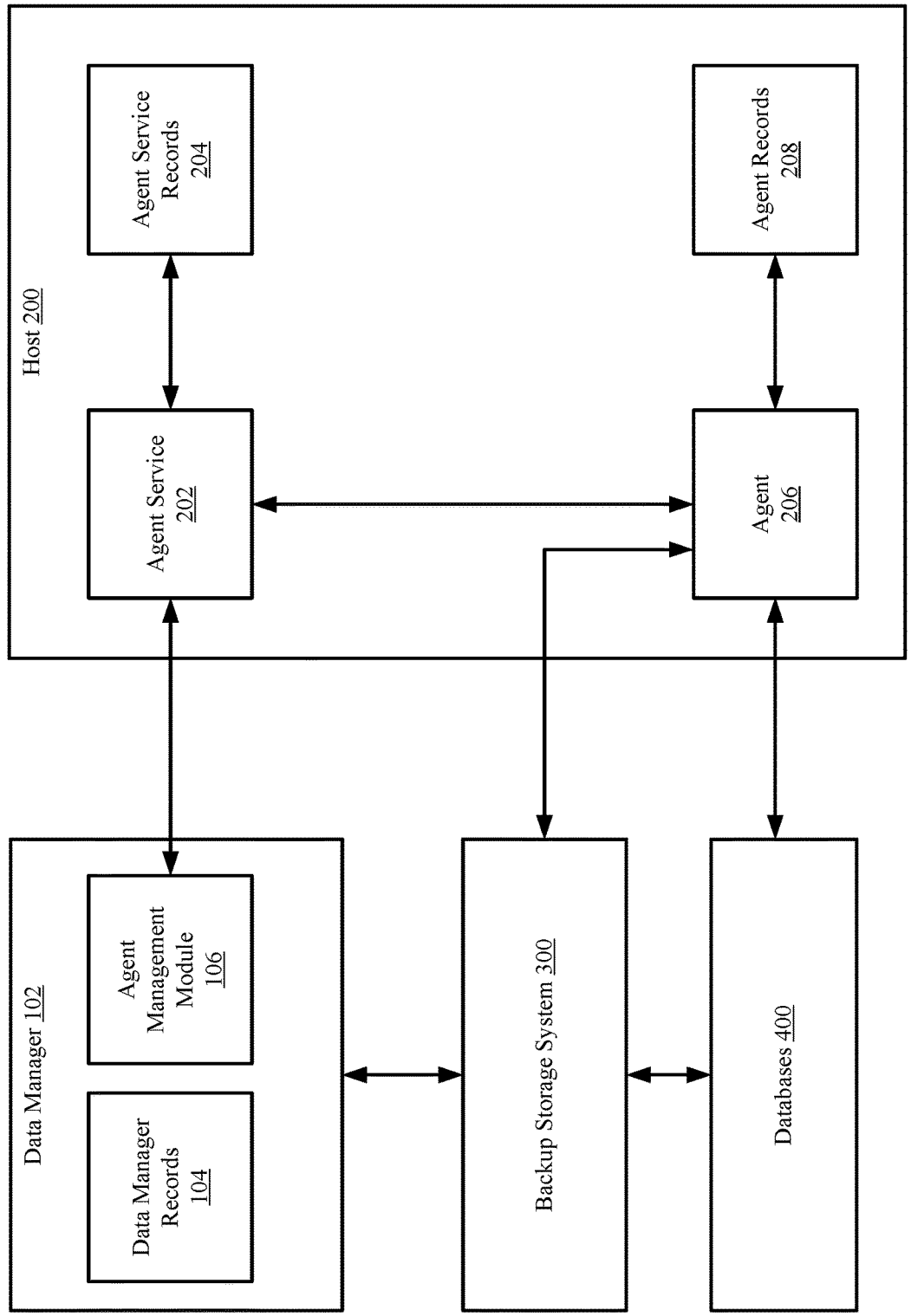
FIG. 1.1

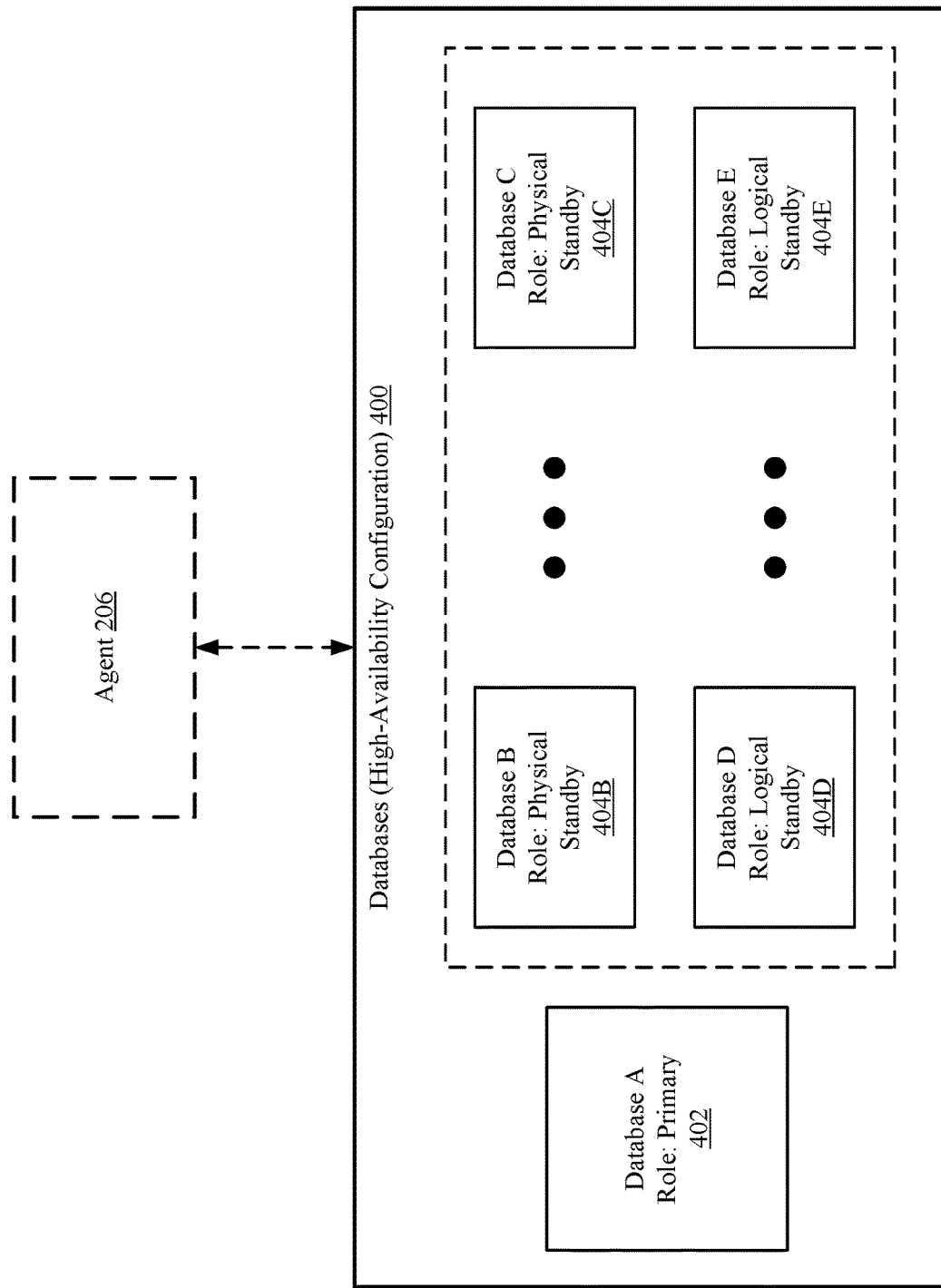
FIG. 1.2

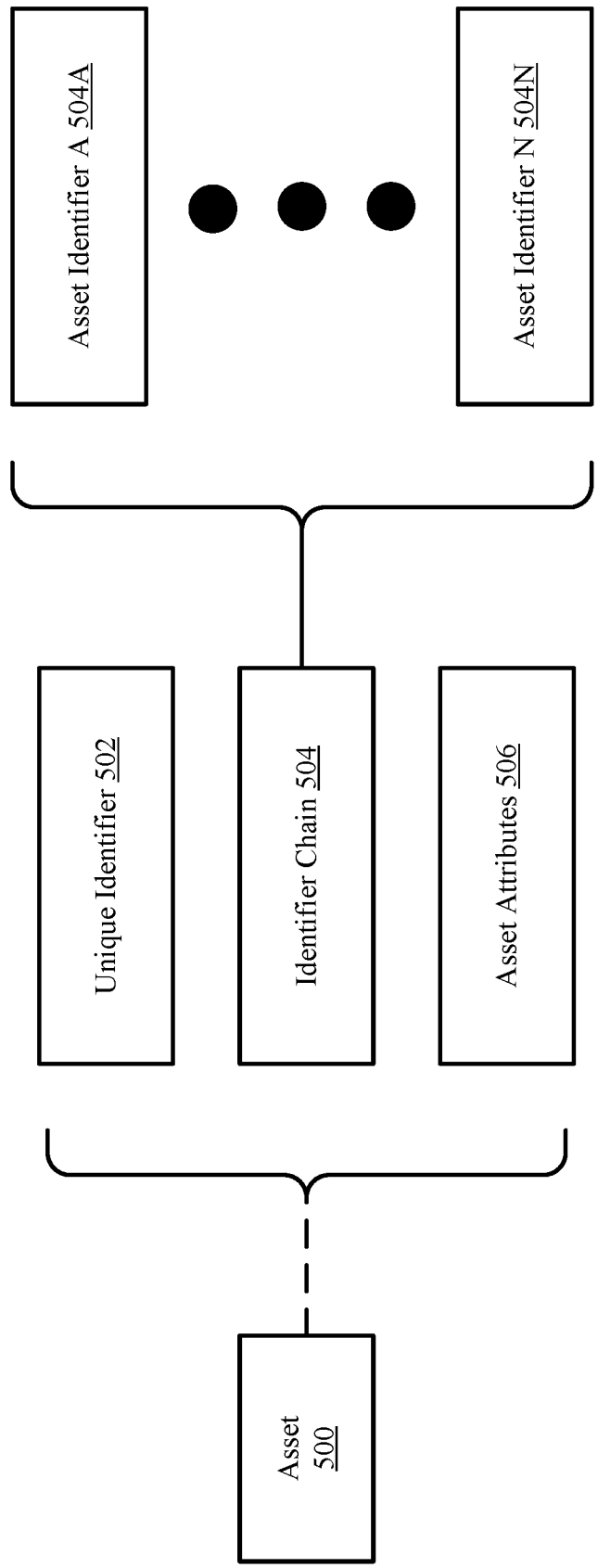
FIG. 1.3

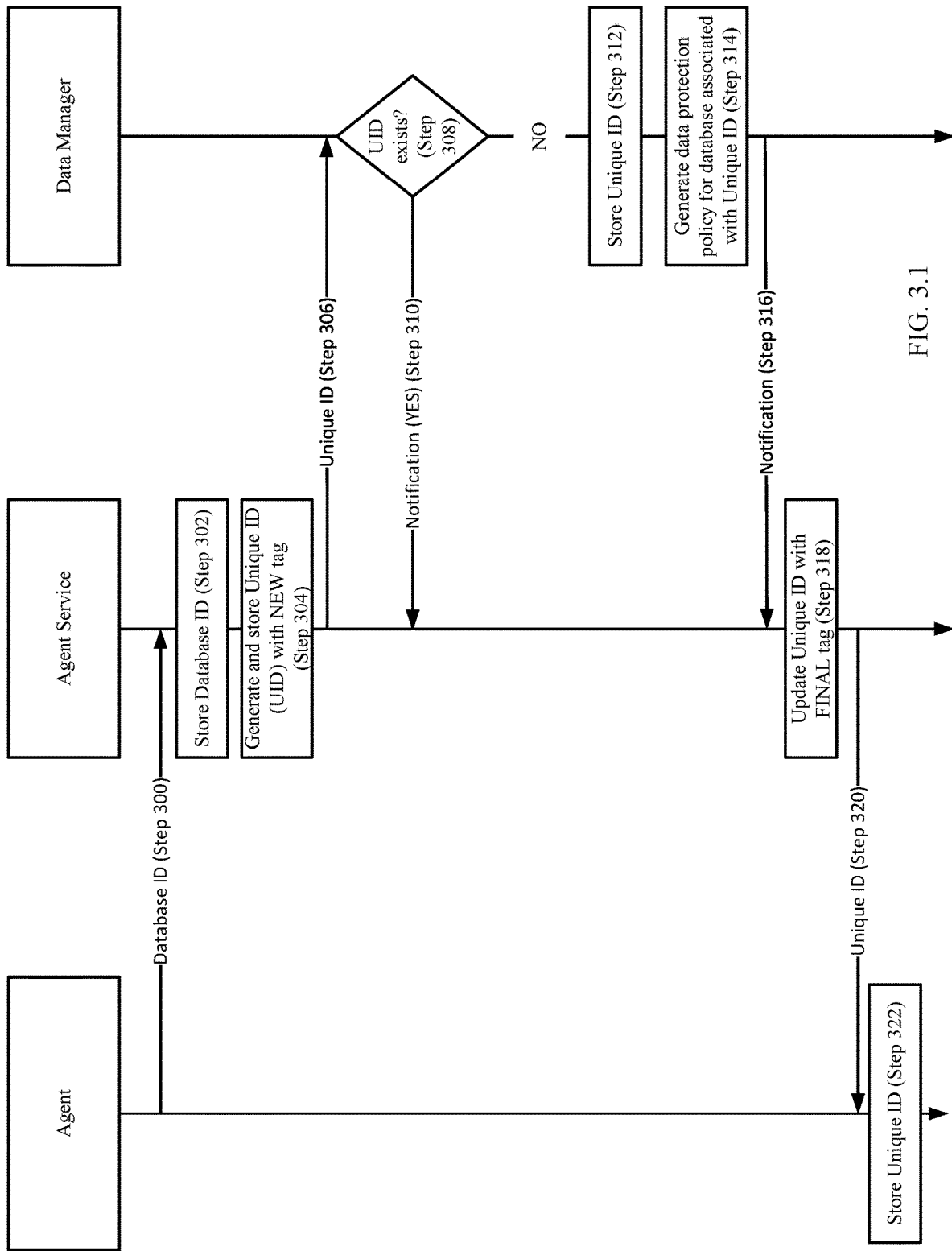
FIG. 3.1

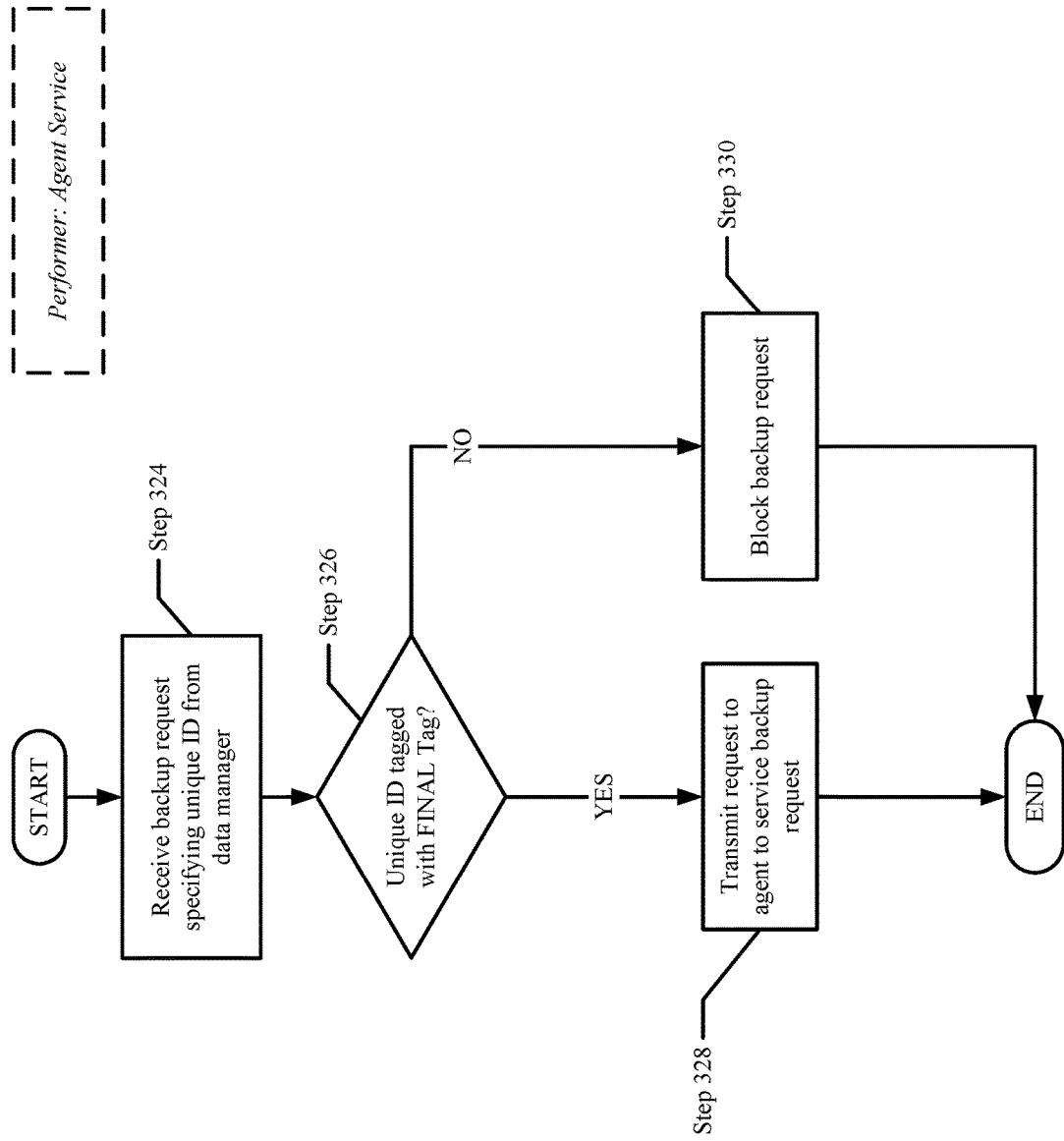
FIG. 3.2

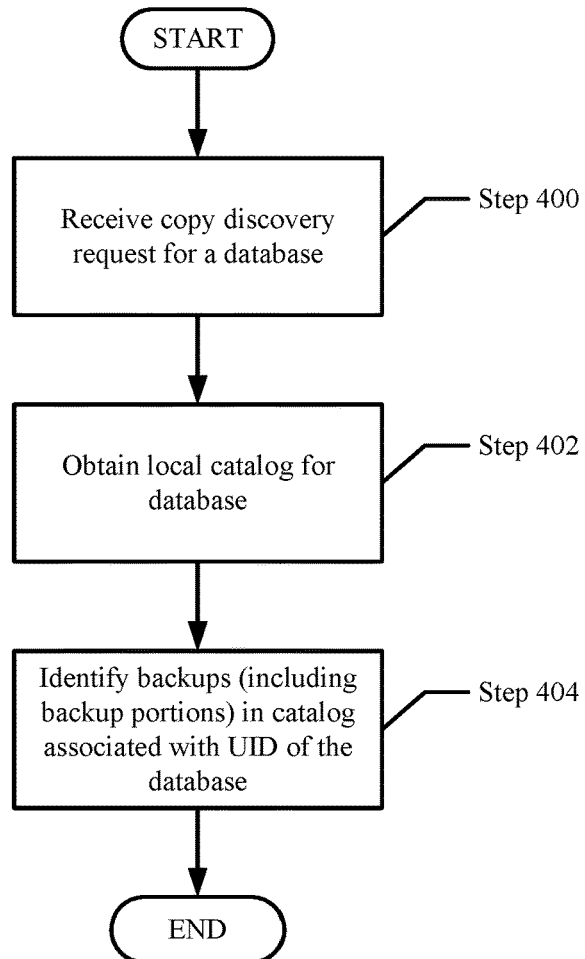
FIG. 4.1

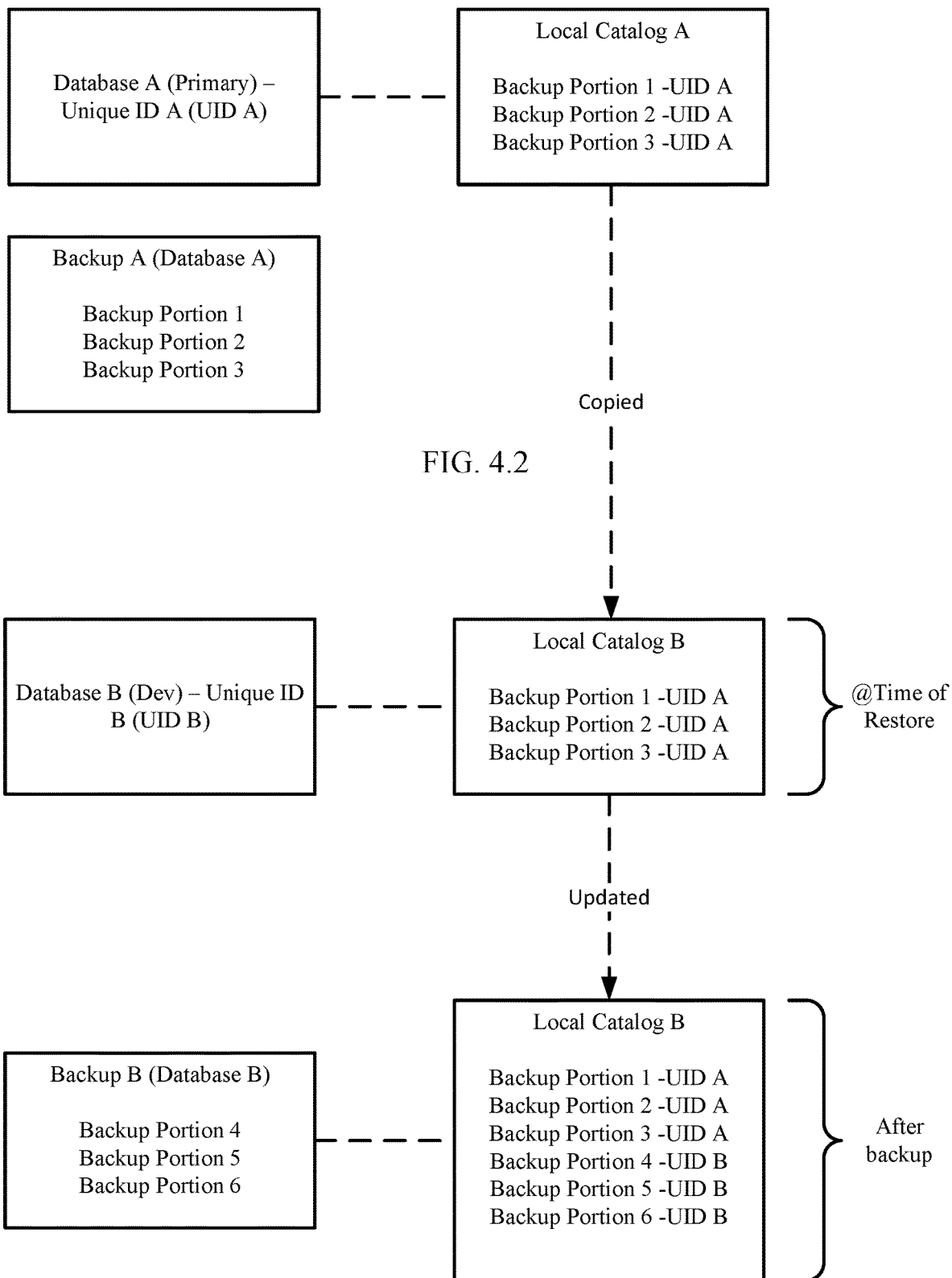
FIG. 4.2
FIG. 4.3

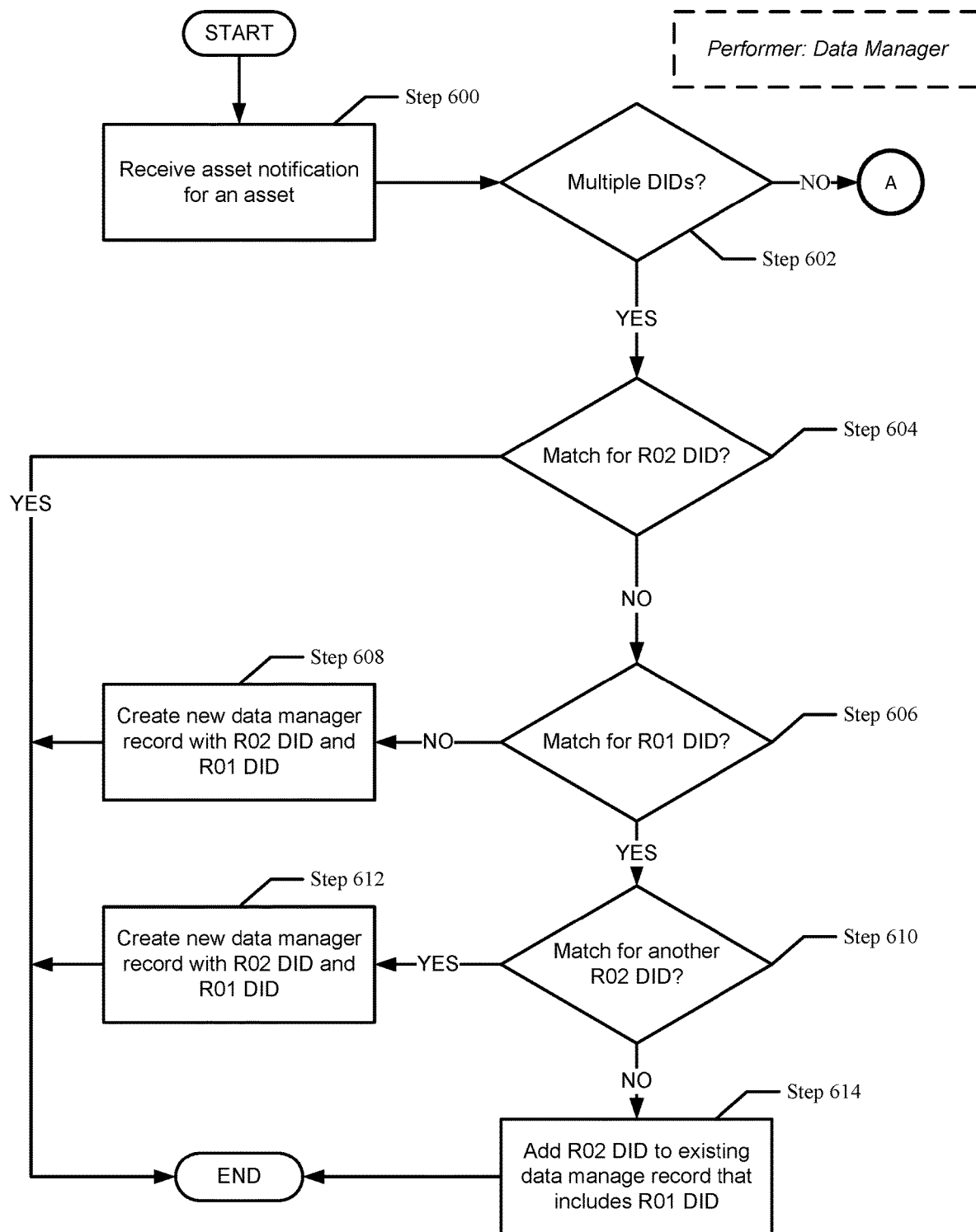
FIG. 6.1

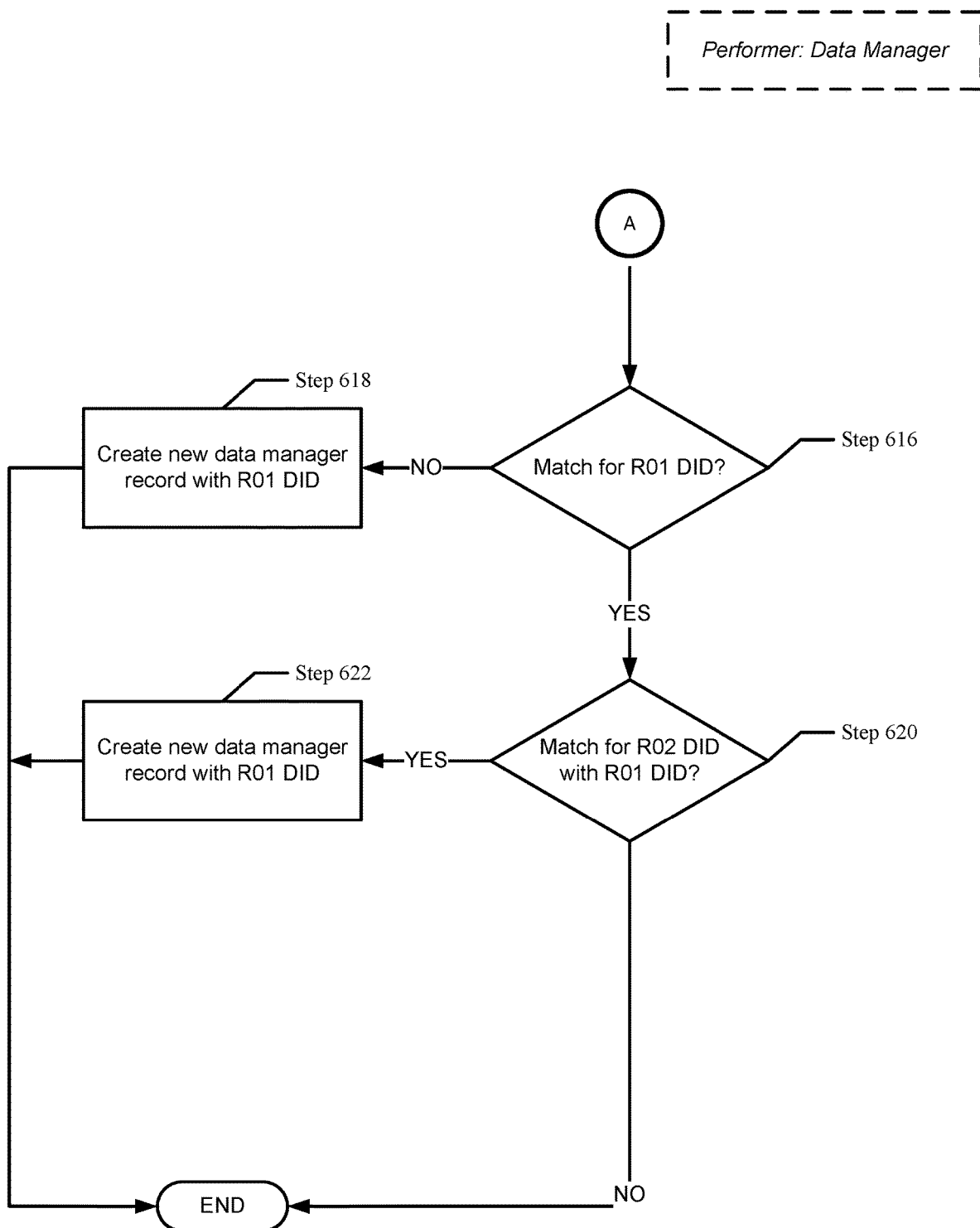
FIG. 6.2

UTILIZING IMMUTABLE UNIQUE IDENTIFIERS TO TAG DATABASE TO ENABLE GRANULAR MANAGEMENT OF DATABASE COPIES

BACKGROUND

Computing devices may include any number of internal components such as processors, memory, and persistent storage. Computing resources associated with (e.g., used by) each of these internal components may be used to generate, store, and backup data. The backing up of data needs to be performed in a manner that minimizes the impact on users of the computing devices.

BRIEF DESCRIPTION OF DRAWINGS

Certain embodiments of the technology will be described with reference to the accompanying drawings. However, the accompanying drawings illustrate only certain aspects or implementations of the technology by way of example and are not meant to limit the scope of the claims.

FIG. 1.1 shows a diagram of a system in accordance with one or more embodiments of the technology.

FIG. 1.2 shows a diagram of a configuration of databases in accordance with one or more embodiments of the technology.

FIG. 1.3 shows a diagram of the data structure associated of information that may be tracked for with each an asset in accordance with one or more embodiments of the technology.

FIGS. 3.1-3.2 show flowcharts of a method for protecting assets in accordance with one or more embodiments of the technology.

FIG. 4.1 shows a flowchart of a method for copy discovery in accordance with one or more embodiments of the technology.

FIGS. 4.2-4.3 show diagrams of databases in accordance with one or more embodiments of the technology.

FIGS. 6.1-6.2 show flowcharts for performing asset records update operation in accordance with one or more embodiments of the technology.

DETAILED DESCRIPTION

Figure 2:
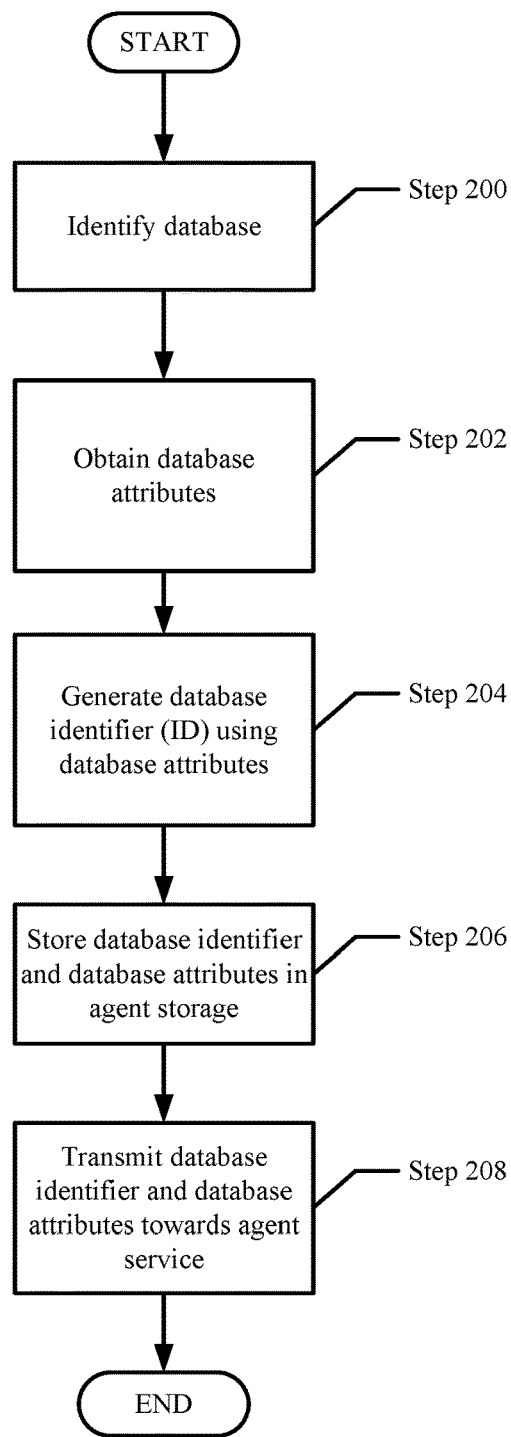
FIG. 2 shows a flowchart of a method for performing discovery in accordance with one or more embodiments of the technology.

In general, embodiments of the technology relate to protecting assets (e.g., creating redundant copies of assets) by associating assets with immutable unique identifiers. In the context of this technology, an asset is data or a database that is associated with a file, a folder and/or any other data hierarchy (or structure) (e.g., a volume). Various embodiments relate to identifying assets and then assigning assets unique identifiers (see e.g., FIGS. 2, 3.1, and 5) and then managing the protection of these assets using the unique identifiers (see e.g., FIGS. 3.2, 4.1, 4.2, 4.3).

Further, in certain scenarios, the use of the unique identifier may be implemented on a system that was previously not using unique identifiers. Embodiments of the technology address this use case (see e.g., FIGS. 3.1 and 5). As will be discussed below, the unique identifiers are generated (or otherwise derived from) the database identifier(s). In certain scenarios, all agents in the system may use the same algorithm (or function) to generate the database identifiers. In other scenarios, certain agents in the system may be upgraded. In such cases, the data manager (see e.g., FIG. 1.1), which manages the overall protection (also referred to as data protection) of the databases, may include entries that include database identifiers that are generated using different algorithms (or functions). Accordingly, the data manager may perform the methods shown in FIGS. 6.1-6.2 to support heterogeneous agents (e.g., agents and legacy agents thereof).

With respect to the unique identifiers, in one embodiment of the technology, a unique identifier is generated for an asset based on certain attributes of the asset. This identifier is unique for each asset, and is immutable throughout the lifetime of the asset regardless of any changes made to the asset. The protection strategy (also referred to as a data protection strategy) of the asset will be associated with this unique identifier, so that the asset as well as all copies of the asset (e.g., backups) will be protected at all times. This approach accounts for the dynamic nature of the system and its tendency to change over time, and ensures that no asset will be unavailable if there is a failure, change, or update to the protection policies of any of the system's assets.

The following describes one or more embodiments of the technology.

The methods described in FIGS. 2-6.2 may be performed on the systems and/or components shown in FIGS. 1.1-1.2 and 7.

FIG. 1.1 shows a diagram of a system in accordance with one or more embodiments described herein. The system includes a data manager (102), one or more hosts (e.g., 200), one or more backup storage systems (e.g., 300), and one or more databases (400). Each of these components is described below.

In one or more embodiments, the components in FIG. 1.1 may operatively connect to one another through a network (e.g., a local area network (LAN), a wide area network (WAN) such as the Internet, a mobile network, etc.). The network may be implemented using any combination of wired and/or wireless connections. Further, the network may encompass various interconnected, network-enabled sub-components (or systems) (e.g., switches, routers, gateways, etc.) that may facilitate communications between the above-mentioned system (100) components. Moreover, the components may communicate with one another using any combination of wired and/or wireless communication protocols.

The data manager (102) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that, when executed by the processor(s) of the computing device, cause the computing device to perform the functions described herein and/or all, or a portion, of the methods illustrated in FIGS. 2-6.2. The data manager (102) may be implemented using other types of computing devices without departing from embodiments disclosed herein. For additional details regarding computing devices, refer to FIG. 7.

The data manager (102) may be implemented using logical devices without departing from embodiments disclosed herein. For example, the data manager (102) may include virtual machines that utilize computing resources of any number of physical computing devices to provide the functionality of the data manager (102). The data manager (102) may be implemented using other types of logical devices without departing from the embodiments disclosed herein.

In one or more embodiments, the data manager (102) may include the functionality to, or may be otherwise programmed to, perform backup orchestration services databases (400).

In one or more embodiments, data manager records (104) include records (or entries) about the assets (e.g., the databases (400)) that the data manager (102) is protecting (i.e., performing backup services for). The records for each of the assets may include, but is not limited to, (i) one or more identifiers of the assets, (ii) the current role of the asset (e.g., primary, secondary, etc.), and (iii) any other information that is required by the data manager (102) to perform the methods described herein. Further, the data manager records (104) may include, but are not limited to, backup polices (or protection policies), that describe what assets to backup, when to back up such assets, and the type of backup (e.g., incremental or full) to generate. Further, data manager records (104) may be stored in any type volatile and/or persistent storage using any type of data structure(s). Additional detail about the information that is tracked for an asset is provided in FIG. 1.3 and also described throughout the application.

In one or more embodiments, the agent management module (106) is a component that enables communication between the data manager (102) and the agent service (202) within the host (200). The agent management module is operatively connected to the agent service (202) in the host (200), described in detail below.

In one or more embodiments, the host (200) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the host (200) described herein and/or all, or a portion, of the methods illustrated in FIGS. 2-6.2. The host (200) may be implemented using other types of computing devices without departing from the embodiments disclosed herein. For additional details regarding computing devices, refer to FIG. 7.

The host (200) may be implemented using logical devices without departing from the embodiments disclosed herein. For example, the host (200) may include virtual machines that utilize computing resources of any number of physical computing devices to provide the functionality of the host (200). The host (200) may be implemented using other types of logical devices without departing from the embodiments disclosed herein.

In one or more embodiments, the host (200) may include the functionality to, or otherwise be configured to, discover assets, and to perform backup jobs orchestrated by the data manager (102) to copy data in the databases (400) to the backup storage system (300). The host (200) may include the functionality to perform all, or a portion of, the methods discussed in FIGS. 2-6.2. The host (200) may include other and/or additional functionalities without departing from embodiments disclosed herein.

In one or more embodiments, the agent service (202) may be a physical or logical component of the host that provides a communication bridge between the data manager (102) and the agent (206) and further is used to locally manage the various agents on the host (200). The agent service (202) is operatively connected to the agent management module (106) (described above), as well as the agent service records (204) and the agent (206).

In one or more embodiments, the agent service records (204) include records (or entries) about the assets (e.g., the databases (400)) that the agent (206) has discovered. The records for each of the assets may include, but is not limited to, (i) one or more identifiers of the asset, (ii) the current role of the asset (e.g., primary, secondary, etc.), and (iii) any other information that is required by the agent service (202) to perform the methods described herein. Additional detail about the information that is tracked for an asset is provided in FIG. 1.3 and also described throughout the application.

In one or more embodiments, the agent (206) may be a physical or logical component of the host that provides a communication bridge between the databases (400), the backup storage system (300), and the agent service (202). In addition, the agent (206) includes functionality to discovery assets and to perform backup jobs orchestrated by the data manager (102), where the backup jobs are communicated to the agent (206) via the agent service (202). In one or more embodiments, the host (200) may include multiple agents, where each agent is configured to interact with a specific type of database (e.g., a database from a specific vendor).

In one or more embodiments, the agent records (208) include records (or entries) about the assets (e.g., the databases (400)) that the agent (206) has discovered. The records for each of the assets may include, but is not limited, (i) one or more identifiers of the asset, (ii) the current role of the asset (e.g., primary, secondary, etc.), and (iii) any other information that is required by the agent (206) to perform the methods described herein. Additional detail about the information that is tracked for an asset is provided in FIG. 1.3 and also described throughout the application.

In one or more embodiments, the backup storage system (300) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that, when executed by the processor(s) of the computing device, cause the computing device to perform the functions of the backup storage system (300) described herein and/or all, or a portion, of the methods illustrated in FIGS. 2-6.2. The backup storage system (300) may be implemented using other types of computing devices without departing from the embodiments disclosed herein. For additional details regarding computing devices, refer to FIG. 7.

The backup storage system (300) may be implemented using logical devices without departing from the embodiments disclosed herein. For example, the backup storage system (300) may include virtual machines that utilize computing resources of any number of physical computing devices to provide the functionality of the backup storage system (300). The backup storage system (300) may be implemented using other types of logical devices without departing from the embodiments disclosed herein.

In one or more embodiments, the backup storage system (300) may include the functionality to, or otherwise be configured to, store and provide data for users (not shown) of the backup storage system (300) for data protection and/or archiving purposes. The backup storage system (300) may store backup assets (e.g., databases (400)). The backups may include full backups and/or incremental backups. Other and/or additional data may be stored in the backup storage system (300) without departing from embodiments disclosed herein. The backup storage system (300) may include other and/or additional functionalities without departing from embodiments disclosed herein.

In one or more embodiments, the system (100) includes one or more databases (400). In one embodiment, each database may represent a local repository for the organization and consolidation of various forms of information. Each database may span logically across one or more physical storage devices and/or media (not shown), which may or may not be of the same type or co-located at a same physical site. Further, information consolidated in each database may be arranged using any storage mechanism (e.g., a file system, a collection of tables or records, etc.). In one embodiment of the invention, each database may be implemented using persistent (i.e., non-volatile) storage. Examples of persistent storage include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). Additional details about the databases (400) are provided in FIG. 1.2.

While FIG. 1.1 shows a configuration of components, other system (100) configurations may be used without departing from the scope of the technology. In addition, while the components in FIG. 1.1 are shown as distinct components, one or more of these components may be co-located on the same physical hardware without departing from the technology.

Turning now to FIG. 1.2, FIG. 1.2 shows the databases (400) in accordance with one or more embodiments of the technology. The databases are operatively connected to one or more agents (e.g., agent (206)). The databases (400) may be arranged in a high-availability configuration. In such a configuration, each database is assigned a role, e.g., primary, physical standby, logical standby. The databases may be grouped into asset groups, where each asset group includes at least two databases. Further, each asset group includes one database with a role of primary and one or more databases with a role of standby (which may be a logical standby or a physical standby). The role associated with a given database may change over time. For example, if a database with the role of primary becomes unavailable (e.g., loses network connectivity), then another database in the asset group with a role of standby is selected and assigned the role of primary.

In one or more embodiments, a database with the role of primary (e.g., Database A, 402) is the main storage location of data for the asset group. Applications (not shown) executing on a host (e.g., FIG. 1.1, 200) may read data from and write data to this database. The databases (400) include functionality to replicate (or otherwise copy) the data from the database with the role of primary to databases with the role of standby (e.g., 404B, 404C, 404D 404E).

In one embodiment of the technology, databases with the role of physical standby (e.g., 404B, 404C) are identical copies of the database with the role of primary. The contents of the databases with the role of physical standby (e.g., 404B, 404C) may be initially created from a backup of database with the role of primary (e.g., 402). Once created, the databases with the role of physical standby (e.g., 404B, 404C) may be maintained in sync with the contents of the database with the role of primary (e.g., 402) by obtaining redo logs from the database with the role of primary (e.g., 402) and then applying the redo logs to the databases with the role of physical standby (e.g., 404B, 404C).

In one embodiment of the technology, databases with the role of logical standby (e.g., 404D, 404E) include the same content as the database with the role of primary (e.g., 402); however, the structure and/or organization of the content may be different. The contents of the databases with the role of logical standby (e.g., 404D, 404E) may be initially created from a backup of the database with the role of primary (e.g., 402). Once created, the databases with the role of logical standby (e.g., 404D, 404E) may be maintained in sync with the contents of the database with the role of primary (e.g., 402) by obtaining redo logs from the database with the role of primary (e.g., 402), converting the redo logs into SQL statements, and then executing the SQL statements on the contents of the databases with the role of logical standby (e.g., 404D, 404E). Unlike databases with the role of physical standby, databases with the role of logical standby may be used for both data protection and reporting.

In one or more embodiments, each of the databases (400) may include a local catalog (not shown), which stores information about the backups (or portions thereof) made of the data for each the database. Said another way, each time a backup of a database is made, the information related to the backup (including the location of the backup on the backup storage device) is stored in the local catalog. In various implementations, this information, which is specific to backups for a given database, is provided to (or otherwise accessible to) other components in the system (e.g., the agent service (see e.g., FIG. 1.1, 202). Further, the information in the local catalog may be used during copy discovery operations (see e.g., FIG. 4.1) or other operations that require identification of backups (also referred to as copies) of the database (see e.g., FIG. 5). The information stored in the local catalogs may be arranged using any storage mechanism (e.g., a file system, a collection of tables or records, etc.).

While FIG. 1.2 shows a configuration of components, other database configurations may be used without departing from the scope of the technology.

Turning now to FIG. 1.3, FIG. 1.3 shows a diagram of information that may be tracked for each an asset in accordance with one or more embodiments of the technology.

As discussed above, the system (or components therein) tracks various information about each asset (500). This information may include, but is not limited to, a unique identifier (502), an identifier chain (504), and asset attributes (506), each described in detail below.

The asset attributes (506) corresponds to information that the agent (e.g., FIG. 1.1, 206) obtains from/obtain the asset. The asset attributes may include, but are not limited to, various identifiers generated by the specific database software that is used to operate the database, the size of the database, the type of database, the content of the database, the database location (e.g., the database path), and/or any other parameter associated with the database. The agent may periodically obtain asset attributes for databases to which it is operatively connected.

In scenarios in which the asset is a database that is part of a high-availability configuration, the database may be associated with a role of primary, physical standby, or logical standby (see e.g., FIG. 1.2). In such scenarios, the asset attributes may include the role currently associated with the discovered database.

The agent uses the asset attributes to generate asset identifiers (504A, 504N). More specifically, each asset identifier may be generated (or otherwise derived) from all or a portion of asset attributes. For example, the various attributes of the asset may be obtained and then a hash function may be applied to these asset attributes in order to generate an asset identifier. Each time the asset attributes are updated (or otherwise change), a new asset identifier is generated. Each asset identifier may be an alpha, numeric, or alpha-numeric string.

In one embodiment, the agent may include two (or more) identifier functions, where each function uses a different set of asset attributes to generate an asset identifier. For example, a first function may use three asset attributes and a second function may use five asset attributes. In one embodiment, the five attributes include the three attributes (i.e., the three attributes are a subset of the five attributes). Other combinations of attributes may be used without departing from the technology.

In the event that multiple asset identifiers are generated using different functions, then the functions may be tagged as R01, R02, etc., where R01 corresponds to first function and R02 corresponds to the second function. In this example, the function tagged with R02, would be considered a higher ranked function relative to the function tagged with R01. Further, when multiple asset identifiers are created using different functions, the resulting asset identifiers are tagged with the rank (e.g., R01, R02) of the function that was used to generate the asset identifiers.

The identifier chain (504) includes the asset identifiers generated for the asset in an order list (or other data structure) based on when the asset identifier was generated. For example, an asset identifier that is generated at time 1 may be located after an asset identifier for an asset generated at time 2 in the identifier chain (504), where time 2 is after time 1. The identifier chain (504) is used to track (in an ordered manner) all asset identifiers that were generated for the life of the asset (or portion thereof).

In one embodiment of the technology, the Unique Identifier (502), or unique ID (UID), may refer to a database identifier, which is immutable and does not change over time. The UID may be an alpha, numeric, or alpha-numeric string that is used to identify the asset (e.g., a database). The UID is derived from the highest ranked asset identifier when the asset is initially discovered. For example, if the asset is discovered and two asset identifiers (tagged with R01, R02, respectively) are generated, then the UID is generated by applying a function to the asset identifier tagged with R02. In another example, if the asset is discovered and one asset identifier (R01) is generated, then the UID is generated by applying a function to the asset identifier tagged with R01.

Asset attributes may change over time. One example of an attribute of an asset is the role of the asset, which may fluctuate between the roles of primary and standby. As asset attributes, like the role of an asset, change over time, so does the Database identifier of the asset.

While FIG. 1.3 shows a configuration of components, other data structure configurations may be used without departing from the scope of the technology. Further, while the description of FIG. 1.3 discusses identifiers and asset attributes in the context of databases, the same or substantially the same information may be tracked for other types of assets (e.g., volumes) without departing from the technology.

Database Discovery Process

FIG. 2 shows a flowchart of a method for discovering a database in accordance with one or more embodiments of the technology. The method shown in FIG. 2 may be performed by, for example, an agent executing on a host (e.g., 206). Other components of the system in FIGS. 1.1-1.2 may perform all, or a portion, of the method of FIG. 2 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

Turning to FIG. 2, in Step 200, the database is identified by the agent. The agent may use any known or later discovered method to identify the database. The database corresponds to a database (see e.g., 400, FIG. 1.2) that: (i) is newly added to the system, (ii) was previously unavailable (or offline) and now is available (or online), or (iii) was previously discovered but its role (or another attribute) has changed, which requires (or otherwise triggers) its discovery (or re-discovery).

As discussed above, agents are specific to a given type of database; thus, different agents may perform different methods to discover different types of databases.

In Step 202, the agent obtains asset attributes for the database. The agent may use any known or later discovered method to obtain the asset attributes.

Continuing with the discussion of FIG. 2, in Step 204, the agent generates one or more database identifiers for the database using the asset attributes (or a portion thereof). The database identifiers are generated in accordance with the methods described above.

In Step 206, the agent stores the database identifier(s) generated in Step 204 as well as the asset attributes in the agent records (208).

In Step 208, the database identifier and asset attributes are transmitted towards the agent service (e.g., 202 in FIG. 1.1). Upon receipt of the database information, the agent service may store a copy of this information and then transmit this information to the data manager (see e.g., 102 in FIG. 1.1) via the agent management module (106, FIG. 1.1). Additional detail about the transmission of the database identifiers to other components in the system is described in FIGS. 3.1 and 5.

The method shown in FIG. 2 may be performed continuously in order to track changes to the database identifiers of the databases within the system.

The information that is obtained in the discovery process is used to enable the methods described in FIGS. 3.1-6.

While the description in FIG. 2 refers to a database identifier, the database identifier corresponds to an asset identifier when the asset is a database. However, the method shown in FIG. 2 may be used to discover other assets without departing from the technology.

Using Immutable Unique Identifiers for Protecting Assets (e.g., Databases)

Traditionally, a database identifier is used to identify a database. As discussed above, because the database identifier is generated using asset attributes, the database identifier is subject to change as the asset's attributes change. As a result, there is typically no single database identifier that is associated with a database throughout its entire lifetime. As assets (e.g., databases) are backed up, the copies of each asset are tagged with the database identifier of the asset at the time of the backup process. This is done with the intention of avoiding discovering irrelevant copies of an asset tagged with a database identifier; however, this approach may lead to data loss when the database identifier of an asset is updated. When the database identifier of an asset is updated, all copies of the asset that were created before the update of the database identifier may become invalid and are no longer associated with the asset. In order to keep track of all copies of an asset throughout its lifetime, and therefore fully protect the data associated with the asset, there needs to be a database identifier that identifies an asset regardless of any updates or changes made to the asset attributes of the asset.

Unique ID Generation

In order to sufficiently manage data, a unique identifier for each asset that does not change over time is needed. Though the database identifier identifies the current iteration of an asset, a unique identifier is needed to identify all versions of an asset throughout its lifetime—even as asset's attributes change over time. This unique ID is independent of change and cannot be lost, unlike the database identifier, as discussed above.

FIGS. 3.1-3.2 show flowcharts of methods for initially discovering and then generating a unique ID for the asset. The methods shown in FIGS. 3.1-3.2 may be performed by, for example, the data manager (FIG. 1.1, 102), the agent (FIG. 1.1, 206), and the agent service (FIG. 1.1, 202). Other components of the system in FIGS. 1.1-1.2 may perform all, or a portion, of the method of FIGS. 3.1-3.2 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

Turning to FIG. 3.1, in Step 300, a database identifier (as referred to as database ID) is transmitted by the agent to the agent service. This database identifier may be the database identifier of the asset, generated using asset attributes of the asset as described above (see e.g., FIG. 1.3). Further, in various embodiments, if the agent generates multiple database identifiers (each with a different rank), then Step 300 may include sending multiple database identifiers to the agent service.

Further, in certain embodiments, the agent may transmit the current database identifier(s) (i.e., the database identifier(s) that were most recently generated by the agent) and the most recent prior database identifier(s) (i.e., the database identifier(s) that were generated immediately prior to the most recently generated by the agent).

In Step 302, the database identifier for the asset is received from the agent by the agent service. The agent service then stores the current database identifier for the asset. The process then proceeds to Step 304.

However, in one embodiment, if the agent service receives the current database identifier(s) and the most recent prior database identifier(s), then the agent service may use the most recent prior database identifier(s) to determine if there is an existing the agent service record that specifies the most recent prior database identifier(s). More specifically, the agent service may query the identifier chains of the agent service records associated with the assets that have been previously discovered to determine whether there is any the agent service record that include the most recent prior database identifier(s).

If such an agent service record exists, then (i) it is determined that the asset was previously discovered, (ii) the identifier chain associated with the asset is updated to include the current database identifier(s), and (iii) the method ends. However, if there is no match, then the asset was not previously discovered and process proceeds to Step 304.

In Step 304, a unique identifier is generated for the asset by the agent service using the database identifier. If there are multiple database identifiers received from the agent, then the unique ID, is generated from the highest ranking database identifier of the asset received in Step 302. This unique ID is immutable and does not change over time, even as the database identifier of the asset does. The unique ID is stored by the agent service, and is tagged as NEW. The NEW tag indicates that the asset associated with the unique identifier is not currently protected (i.e., associated with a data protection policy).

In Step 306, the unique ID for the asset is transmitted to the data manager by the agent service.

In Step 308, a determination is made about whether or not the unique ID received by the data manager from the agent service exists already in the system. If the unique ID for the asset already exists, the method proceeds to Step 310; if the unique ID for the asset does not already exist, the method proceeds to Step 312. Step 308 is performed to address scenarios in which an asset was previously discovered but the agent services records on the agent service were deleted. As such, while there is a corresponding data manager record specifying the unique ID, the agent service does not have a corresponding the agent service record and, accordingly, treats the asset (i.e., the asset associated with the database ID in Step 300) as if it was the first time that the agent service had discovered this asset.

In Step 310, the agent service is notified by the data manager that the unique ID for the asset already exists in the system and the method proceeds to Step 318.

In Step 312, after determining that the unique ID generated for the asset does not yet exist in the system, the unique ID is stored by the data manager (e.g., in the data manager records).

In Step 314, a data protection policy for the database associated with the unique ID is generated by the data manager. The data protection strategy, for example, may specify the backup frequency and the type of backups to be obtained (e.g., full backup or partial backups). The data protection strategy may also specify a retention time for the back ups. The data protection strategy may include additional and/or different information without departing from the technology.

In Step 316, the agent service is notified by the data manager that the unique ID now exists in the system and is associated with a data protection policy.

In Step 318, the tag associated with the unique ID is updated to FINAL. The FINAL tag signifies that asset associated with the unique ID is now being protected by the data manager.

In Step 320, the unique ID is transmitted to the agent by the agent service.

In Step 322, the unique ID is stored by the agent in agent records. After this step, the method ends.

While the aforementioned description describes storing the unique ID for an asset in agent, the agent service, and the data manager, each of the components may store additional information (see e.g., FIG. 1.3) and/or different information about the asset. Further, the aforementioned components do not necessarily store the same information about the asset; thus, some components may store more or less information about the asset without departing from the technology.

Referring now to FIG. 3.2, FIG. 3.2 shows a method for processing and validating backup requests by the agent. This method is performed by the agent service (FIG. 1.1, 202). By default, the system is configured to only perform data protection on assets identified using a unique ID, where such assets are associated with a data protection policy in the data manager. The enforcement of this policy is performed, in certain embodiments, by the agent service. Other components may perform this enforcement without departing from the technology.

Turning to FIG. 3.2, in Step 324, a backup request to backup a specific database is received by the agent. Included in this backup request is the unique ID of the asset.

In Step 326, a determination is made about whether or not the unique ID of the asset specified in the backup request has been tagged as FINAL. Backup operations on this system can only be conducted if the associated unique ID has been tagged as FINAL, because a FINAL tag signifies that the asset associated with the unique ID are associated with a data protection policy.

If the Unique ID is tagged as FINAL, the method proceeds to Step 328; if the associated unique ID has not been tagged as FINAL, the method proceeds to Step 330.

In Step 328, the agent service transmits the backup request from Step 324 for the asset with the associated FINAL unique ID to the agent. By only allowing backup requests for assets with associated FINAL unique IDs, it is ensured that any asset that is backed up on the system will have the protection policy associated with the unique ID attached. Upon receipt of the backup request by the agent, the agent initiates the backup on the appropriate asset (e.g., database). After the backup is successfully completed, the information about the successful backup is propagated to the data manager (via an agent service). The initiation of the backup process may include the agent instructing the asset to start a backup operation to copy the data from the asset to the backup storage system.

In Step 330, the backup request for the asset with the associated unique ID not tagged as FINAL is blocked. A backup request cannot be transmitted if the unique ID is not marked as FINAL, as it means that the unique ID has not been verified to be consistent with the one stored in the data manager.

Though not shown in FIG. 3.2, other operations on assets, such as copy discovery, may also be blocked by the agent service until the unique ID is associated with a FINAL tag.

Performing Copy Discovery

Once an asset is associated with a unique ID, all copies of the backup are also associated with the unique ID. More specifically, after an asset is associated with a unique ID, this information is propagated to the appropriate agent (see e.g., Step 332). When a subsequent backup request is received from the asset, the agent passes the unique ID to the asset and initiates the backup of the asset. The result of backing up the asset is: (i) a backup of the asset that is stored on the backup storage system and (ii) the addition of one or more entries in a local catalog of the asset, where each of the entries references (or otherwise corresponds to) a portion of the backup and is tagged with the unique ID.

At a later point in time, the data manager may needs to identify all copies (i.e., backups) of the asset. This information may be used by the data manager, e.g., to manage the retention policy of the copies (e.g., determine which copies of the asset to delete from the backup storage system).

FIG. 4.1 shows a flowchart of a method for identifying copies of a database using the unique ID. The method shown in FIG. 4.1 may be performed by, for example, the agent (FIG. 1.1, 206). Other components of the system in FIGS. 1.1-1.2 may perform all, or a portion, of the method of FIG. 4.1 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

Referring to FIG. 4.1, FIG. 4.1 shows a method for identifying copies of an asset and associating the copies with the asset. This methodology is performed by the agent (FIG. 1.1, 206).

Turning to FIG. 4.1, in Step 400, a copy discovery request for an asset (e.g., a database) is received by the agent. The copy discovery request may be received from a data manager (via an agent service) and may the unique ID.

In Step 402, the local catalog for the database is obtained by the agent. More specifically, the agent may extract the unique ID in the copy discovery request and then perform a query on the agent records to identify an agent record with the unique ID. The agent may then use the contents of the agent record (see e.g., FIG. 1.3) to identify the asset. Once the asset is identified, the agent may issue a request to the asset to obtain the local catalog.

In Step 404, one or more backups (or portions thereof) are identified in the local catalog. More specifically, the entries in the local catalog are analyzed to identify entries that are tagged with the unique identifier (i.e., the unique identifier specified in the copy discovery request). If the local catalog includes other entries that are not tagged and/or are associated with a different unique ID, these entries are skipped in step 404 as they do not include the specific unique ID. The information about the identified backups (i.e., the identified entries) are provided to the data manager (via the agent service).

The data manager may store this information in the appropriate data manager record (e.g., the data manager record with the unique ID) and then manage the backups of the asset using this information.

EXAMPLE

Turning to FIG. 4.2, consider a scenario in which a primary database is discovered and associated with a unique ID of A (via the method shown in FIG. 3.1). At some later point in time, a backup Database A is generated (i.e., Backup A). Backup A includes three portions—(backup portion 1, backup portion 2, backup portion 3). Further, as part of the backup operation three corresponding entries are created in a local catalog for Database A (i.e., Local Catalog A), where each of the entries is tagged with unique ID A (i.e., backup portion 1-UID A, backup portion 2-UID A, backup portion 3-UID A).

The Data Manager subsequently performs a copy discovery, per FIG. 4.1, for the asset with the Unique ID of A (i.e., on Database A). The result of the copy discovery is that the data manager identifies the three entries in Local Catalog A and applies Retention Policy X to these entries, where the retention time is 14 days.

Referring to FIG. 4.3, after the Backup A is created, Backup A is used to perform a restore operation in order to generate a development database of Database A (i.e., Database B (Dev)). As part of the restore operation, Local Catalog B is created, where Local Catalog B is a copy of Local Catalog A. Database B is subsequently discovered and associated with a unique ID of B (via the method shown in FIG. 3.1).

At some later point in time, a backup database B is generated (i.e., Backup B). Backup B includes three portions—(backup portion 4, backup portion 5, backup portion 6). Further, as part of the backup operation, three corresponding entries are created in a local catalog for Database A (i.e., Local Catalog B), where each of the entries is tagged with unique ID B (i.e., backup portion 4-UID B, backup portion 5-UID B, backup portion 6-UID B). At this point Local Catalog B has six entries.

The Data Manager subsequently performs a copy discovery, per FIG. 4.1, for the asset with the Unique ID of B (i.e., on database B). The result of the copy discovery is that the data manager identifies the three entries in Local Catalog B associated with unique ID of B and applies Retention Policy Y to these entries, where the retention time is five days. While Local Catalog B has six entries, only three have a unique ID of B and, as such, only these entries are identified during copy discovery.

Prior to the implementation of the unique IDs and the tagging of copies with the unique IDs, in the scenario shown in FIGS. 4.2 and 4.3, the copy discovery performed on Local Catalog B would result in the improper identification of six entries. Thus, the six entries would be subject to retention policy Y (where backup portion 1, backup portion 2, backup portion 3 would also be associated with retention policy X). Consequently, backup portion 1, backup portion 2, backup portion 3 would be deleted after five days instead of the 14 days expected by the user. Thus, potentially resulting in data unavailability for Database A.

End of Example

Unique ID Assignment for Previously Protected Assets

Consider a scenario in which the system includes assets (e.g., databases) that are already being protected by the data manager using a mechanism that does not use unique identifiers. At a later point in time, the data manager is upgraded to protect assets using unique identifiers. After the update, the system implements FIGS. 3.1-3.2 to discover and protect assets. However, as discussed above, once the data manager is upgraded to use unique identifiers, the agent service blocks backup requests and copy discovery requests on assets and copies that do not have a unique identifier. Thus, for example, if at time 1, Database A has five backups and at time 2 the data manager is upgraded, copy discovery cannot be performed on Database A until after it has been associated with a unique identifier (see e.g., FIG. 3.1) and, during this transition period, copy discovery cannot occur (i.e., it is blocked, see e.g., FIG. 3.2). Thus, during the transition period, because the copy discovery on Database A cannot occur, all copies of Database A may be not discovered by (or known to) the data manager. This can lead to data unavailability if a restore is required during the transition period and all copies of Database A are not known to the data manager.

Figure 5:
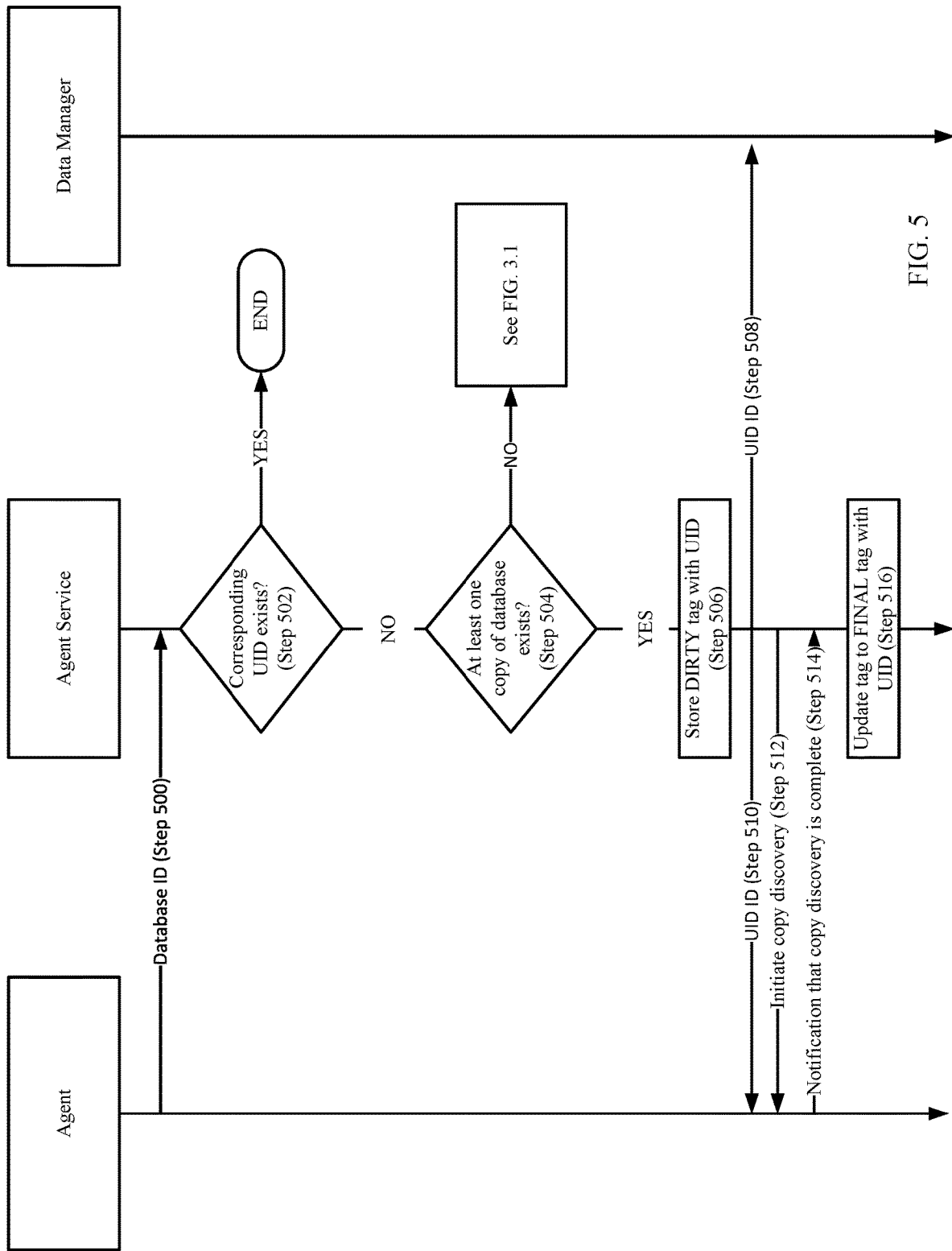
FIG. 5 shows flowcharts of a method for protecting assets in accordance with one or more embodiments of the technology.

To address this issue, FIG. 5 shows a flowchart of a method for associating a unique ID to an asset that has previously been protected. The method shown in FIG. 5 may be performed by, for example, the data manager (102), the agent (206), and the agent service (202). Other components of the system in FIGS. 1.1-1.2 may perform all, or a portion, of the method of FIG. 5 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

Turning to FIG. 5, in Step 500, a database identifier is transmitted by the agent to the agent service. Step 500 is substantially the same as Step 300 in FIG. 3.1.

In Step 502, a determination is made about whether there is an existing unique ID that corresponds to the database identifier received by the agent service from the agent. If there is a corresponding unique ID, the method ends; if there is not a corresponding unique ID, the method proceeds to Step 504.

The determination in Step 502 includes generating the unique ID (discussed above) from the database identifier and then performing a lookup in the agent service records to determine if there is an existing the agent service record that includes the unique ID.

Continuing with the discussion of FIG. 5, in Step 504, a determination is made about whether there is at least one copy of the database that corresponds to the database identifier received by the agent service from the agent. If there is at least one copy of the database, the method proceeds to Step 506. However, if there are no copies, the method proceeds to FIG. 3.1. In particular, the unique ID is tagged with a NEW tag and the method proceeds to Step 306 in FIG. 3.1.

Returning to FIG. 5, with respect to Step 504, prior to making the determination, copy discovery has been previously performed (i.e., by the data manager prior to being upgraded) and, as a result, the agent service records include information about the copies of the databases identified during this process. Thus, the determination in Step 504 includes using the database identifier to determine whether any copies of the database were previously identified (i.e., whether there was at least one copy of the database).

Continuing with FIG. 5, in Step 506, the agent service stores the unique ID for the asset and tags it as DIRTY. In Step 508, the unique ID is sent to the data manager. The data manager may then store the unique ID in a data manager record for subsequent use (e.g., when the asset is discovered after the upgrade (see e.g., FIG. 3.1)). In step 510, the unique ID is sent to the agent, which subsequently stores the unique ID in an asset record.

In Step 512, copy discovery for the database is initiated by the agent service on the agent. Because the unique ID is tagged as DIRTY, the copy discovery is performed without using a unique identifier. Thus, all copies of the database specified in the local catalog of the database are identified and deemed to be copies of the database.

In Step 514, the agent notifies the agent service that the copy discovery process conducted in Step 512 has been completed and all copies of the database associated with the unique ID tagged as DIRTY have been discovered. The information obtained during the copy discovery is stored in the agent service records and, as appropriate, provided to the data manager.

In Step 516, the tag associated with the unique ID is updated to FINAL. As discussed with respect to FIG. 3.2, by setting the flag to FINAL, during the transition period, the data manager will be able to issue backup requests and copy discovery requests (as well as other similar requests) to the agent service, and the agent service will allow such requests to proceed as the unique ID is marked a FINAL tag.

Updating the Database Identifier of Assets

Consider a scenario in which the system includes agents that use a first function to generate a database identifier. At a later point in time, some of the agents are upgraded to use a second function to generate the database identifier. Further, in one embodiment, the first function (also referred to R01 or the lower ranked function) results in a higher likelihood of generating the same database identifier for two different databases (i.e., a higher likelihood of collisions) as compared to the second function (also referred to R021 or the higher ranked function).

As discussed above, the data identifiers are used to generate the unique identifiers and also used to link assets to unique identifiers (see e.g., data structure in FIG. 1.3). Thus, to enable the data manager to support different versions of the agents (e.g., a legacy agent and current agent). Further, the agents and data manager need a mechanism to determine if an asset with a given database identifier is a new asset or an existing asset.

FIGS. 6.1-6.2 show flowcharts for performing asset records update operation in accordance with one or more embodiments of the technology. The method shown in FIGS. 6.1-6.2 may be performed by, for example, the data manager (FIG. 1.1, 102). Other components of the system in FIGS. 1.1-1.2 may perform all, or a portion, of the method of FIGS. 6.1-6.2 without departing from the scope of the invention.

All or a portion of the method shown may be performed by one or more components of the system. While the various Steps in this flowchart are presented and described sequentially, one of ordinary skill in the relevant art will appreciate that some or all of the Steps may be executed in different orders, combined, or omitted, and some or all Steps may be executed in parallel.

The method shown in FIGS. 6.1-6.2, enables legacy and current agents to provide (via the agent service) database identifiers to data manager and the data manager is able to determine whether the database identifiers are associated with new or previously discovered assets.

Turning to FIG. 6.1, in Step 600, an asset notification is received for an asset, where the asset notification includes: (i) a database identifier if the asset notification originated from a legacy agent or (ii) two database identifiers (denoted using R01 and R02 (as discussed above)) if the asset originated from a current agent (i.e., a non-legacy agent).

In Step 602, a determination is made about whether the asset notification includes multiple database identifiers (DIDs) (i.e., DID R02 and DID R01). If the asset notification includes multiple DIDs, the method proceeds to Step 604; otherwise, the method proceeds to FIG. 6.2, Step 616.

In Step 604, a determination is made about whether there is a data manager record that includes a database identifier generated using the higher ranked function (i.e., DID R02). If there is a data manager record that includes a database identifier generated using the higher ranked function, the process ends, as the database has already been discovered; otherwise the process proceeds to Step 606.

In Step 606, a determination is made about whether there is a data manager record that includes a database identifier generated using the lower ranked function (i.e., DID R01). If there is a data manager record that includes a database identifier generated using the lower ranked function, the process proceeds to step 610; otherwise the process proceeds to Step 608.

In Step 608, a new data manager record is created that includes the two database identifiers (i.e., DID R02 and DID R01). The process then ends.

In Step 610, a determination is made about whether there is a data manager record that includes a database identifier generated using the lower ranked function (i.e., DID R01) and a different database identifier generated using the higher ranked function. If there is such a data manager record, the process proceeds to step 612; otherwise the process proceeds to Step 614.

In Step 612, a new data manager record is created that includes the two database identifiers (i.e., DID R02 and DID R01). The process then ends. Step 612 accounts for the scenario in which there are two distinct assets that have the same database identifier generated using the lower ranked function (i.e., there is a collision of database identifiers generated using R01), but have different database identifiers generated using the higher ranked function.

In Step 614, the database identifier generated using the higher ranked function is added to an existing record that includes only the database identifier generated using the lower ranked function. The process then ends. Step 614 accounts for the scenario in which the asset was previously discovered by a legacy agent, and now has been discovered by a current (i.e. non-legacy) agent.

Referring now to FIG. 6.2, if the asset notification does not include multiple database identifiers (DIDs), then in Step 616, a determination is made about whether there is a data manager record that includes a database identifier generated using the lower ranked function (i.e., DID R01). If there is a data manager record that includes a database identifier generated using the lower ranked function, the process proceeds to step 620; otherwise the process proceeds to Step 618.

In Step 618, a new data manager record is created that includes one database identifier (i.e., DID R01). The process then ends.

In Step 620, a determination is made about whether there is a data manager record that includes a database identifier generated using the higher ranked function (i.e., DID R02), and a database identifier generated using the lower ranked function (i.e., DID R02). If there is such a data manager record, the process proceeds to step 624; otherwise the process end.

Step 620 accounts for the scenario in which there are two distinct assets that have the same database identifier generated using the lower ranked function (i.e., there is a collision) and the data manager includes a data manager record that includes both DID R01 and a database identifier generated using the higher ranked function. In this scenario, the asset that is the subject of the record was previously discovered using a current (i.e., non-legacy) agent, which resulted in the record with two database identifiers.

In Step 622, a new data manager record is created that includes one database identifier (i.e., DID R01). The process then ends.

Figure 7:
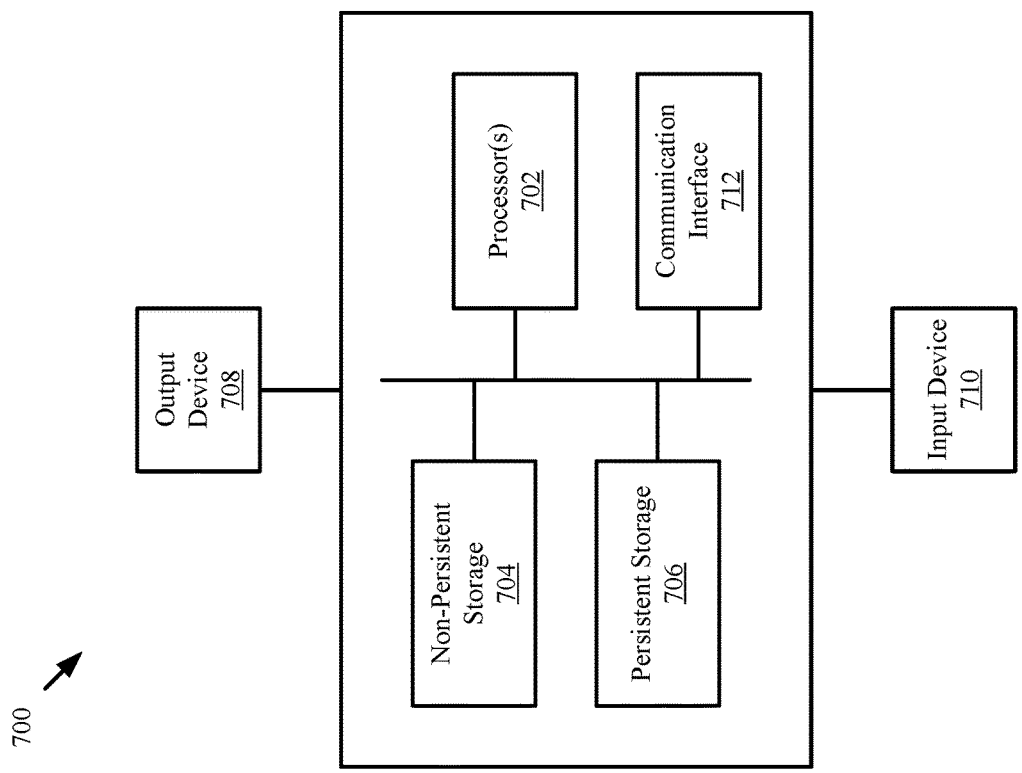
FIG. 7 shows a computing system in accordance with one or more embodiments of the technology.

As discussed above, embodiments described herein may be implemented using computing devices. FIG. 7 shows a diagram of a computing device in accordance with one or more embodiments disclosed. The computing device (700)

may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one or more embodiments, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one or more embodiments, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many diverse types of computing devices exist, and the aforementioned input and output device(s) may take other forms.

The problems discussed above should be understood as being examples of problems solved by embodiments described herein, and the scope of the embodiments should not be limited to solving the same/similar problems. The disclosed technology is broadly applicable to address a range of problems beyond those discussed herein.

One or more embodiments of the technology may be implemented using instructions executed by one or more processors of a computing device. Further, such instructions may correspond to computer readable instructions that are stored on one or more non-transitory computer readable mediums.

In the above description, there are references to database identifiers. It will be understood by those skilled in the art, and having the benefit of this Detailed Description, that a database identifier corresponds to an asset identifier when the asset is a database. Further, while the various embodiments are described with respect to databases, embodiments of the technology may be implemented for other types of assets (e.g., storage volumes) without departing from the technology.

In the above description, numerous details are set forth as examples of embodiments described herein. It will be understood by those skilled in the art, and having the benefit of this Detailed Description, that one or more embodiments of embodiments described herein may be practiced without these specific details and that numerous variations or modifications may be possible without departing from the scope of the embodiments described herein. Certain details known to those of ordinary skill in the art may be omitted to avoid obscuring the description.

In the above description of the figures, any component described with regard to a figure, in various embodiments described herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as B to C or D to E. As used herein, the aforementioned labeling means that the element may include any number of items, and does not require that the element include the same number of elements as any other item labeled as B to C or D to E. For example, a data structure may include a first element labeled as B and a second element labeled as C. This labeling convention means that the data structure may include any number of the elements. A second data structure, also labeled as B to C or D to E, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing database copies, the method comprising:
    receiving a unique identifier (UID) for a database from an agent service, wherein the agent service and an agent execute on a host operatively connected to the database and a data manager;
    initiating, by the agent, a generation of a copy of the database, wherein the generation of the copy results in an entry corresponding to the copy being created in a local catalog associated with the database, wherein information related to the copy of the database is stored in a backup storage device;
    tagging the entry using the UID;
    receiving, after the tagging, a request to perform copy discovery on the database, wherein the database is associated with the UID;
    obtaining, by the agent, the local catalog associated with the database, wherein the obtaining comprises:
        extracting the UID from the request to perform copy discovery on the database,
        performing, using the UID, a query on a plurality of agent records,
        identifying, based on the query, an agent record of the plurality of agent records, wherein the agent record comprises the UID and identifies the database, and
        issuing, by the agent, a request to obtain the local catalog associated with the database;
    identifying, using the agent, entries corresponding to copies of the database specified in the local catalog that are associated with the UID; and
    providing, by the agent, information about the identified copies to the data manager, wherein the data manager applies a retention policy to the identified copies.

2. The method of claim 1, wherein the local catalog specifies a plurality of copies, wherein a first portion of the plurality of copies are associated with the UID and a second portion of the plurality of copies are associated with a second UID.

3. The method of claim 2, wherein the second UID is associated with a second database, wherein the database is restored from a copy of the second database.

4. The method of claim 2, wherein a second retention policy is associated with the second UID, wherein a retention time specified in the retention policy is different than a retention time specified in the second retention policy.

5. The method of claim 1, wherein the UID is generated using a database identifier of the database.

6. The method of claim 5, wherein the database identifier is generated by the agent, wherein the agent provides the database identifier to the agent service, and wherein the UID is generated by the database identifier.

7. A non-transitory computer readable medium comprising instructions which, when executed by a computer processor, enables the computer processor to perform a method for managing database copies, the method comprising:
    receiving a unique identifier (UID) for a database from an agent service, wherein the agent service and an agent execute on a host operatively connected to the database and a data manager;
    initiating, by the agent, a generation of a copy of the database, wherein the generation of the copy results in an entry corresponding to the copy being created in a local catalog associated with the database, wherein information related to the copy of the database is stored in a backup storage device;
    tagging the entry using the UID;
    receiving, after the tagging, a request to perform copy discovery on the database, wherein the database is associated with the UID;
    obtaining, by the agent, the local catalog associated with the database, wherein the obtaining comprises:
        extracting the UID from the request to perform copy discovery on the database,
        performing, using the UID, a query on a plurality of agent records,
        identifying, based on the query, an agent record of the plurality of agent records, wherein the agent record comprises the UID and identifies the database, and
        issuing, by the agent, a request to obtain the local catalog associated with the database;
    identifying, using the agent, entries corresponding to copies of the database specified in the local catalog that are associated with the UID; and
    providing, by the agent, information about the identified copies to the data manager, wherein the data manager applies a retention policy to the identified copies.

8. The non-transitory computer readable medium of claim 7, wherein the local catalog specifies a plurality of copies, wherein a first portion of the plurality of copies are associated with the UID and a second portion of the plurality of copies are associated with a second UID.

9. The non-transitory computer readable medium of claim 8, wherein the second UID is associated with a second database, wherein the database is restored from a copy of the second database.

10. The non-transitory computer readable medium of claim 8, wherein a second retention policy is associated with the second UID, wherein a retention time specified in the retention policy is different than a retention time specified in the second retention policy.

11. The non-transitory computer readable medium of claim 7, wherein the UID is generated using a database identifier of the database.

12. The non-transitory computer readable medium of claim 11, wherein the database identifier is generated by the agent, wherein the agent provides the database identifier to the agent service, and wherein the UID is generated by the database identifier.

13. A computing device, comprising:
    an agent executing on the system, and operatively connected to a database;
    an agent service, executing on the system, wherein the agent service comprises at least one processor and at least one memory that includes instructions, which when executed by the processor, performs a method to:
    receive a unique identifier (UID) for the database from the agent service;
    initiate, by the agent, a generation of a copy of the database, wherein the generation of the copy results in an entry corresponding to the copy being created in a local catalog associated with the database, wherein information related to the copy of the database is stored in a backup storage device;
    tag the entry using the UID;
    receive, after the tagging, a request to perform copy discovery on the database, wherein the database is associated with the UID;
    obtain, by the agent, the local catalog associated with the database, wherein the local catalog is obtained by:
        extracting the UID from the request to perform copy discovery on the database, performing, using the UID, a query on a plurality of agent records, identifying, based on the query, an agent record of the plurality of agent records, wherein the agent record comprises the UID and identifies the database, issuing, by the agent, a request to obtain the local catalog associated with the database;

identify, using the agent, entries corresponding to copies of the database specified in the local catalog that are associated with the UID; and provide, by the agent, information about the identified copies to the data manager, wherein the data manager applies a retention policy to the identified copies.

14. The computing device of claim 13, wherein the local catalog specifies a plurality of copies, wherein a first portion of the plurality of copies are associated with the UID and a second portion of the plurality of copies are associated with a second UID.

15. The computing device of claim 14, wherein the second UID is associated with a second database, wherein the database is restored from a copy of the second database.

16. The computing device of claim 14, wherein a second retention policy is associated with the second UID, wherein a retention time specified in the retention policy is different than a retention time specified in the second retention policy.

17. The computing device of claim 13, wherein the UID is generated using a database identifier of the database, wherein the database identifier is generated by the agent, wherein the agent provides the database identifier to the agent service, and wherein the UID is generated by the database identifier.

* * * * *